(12) United States Patent
Sachs (10) Patent No.: US 12,247,834 B2
(45) Date of Patent: Mar. 11, 2025

(54) REDUCING ERROR IN ESTIMATED ANGULAR POSITION OF A ROTOR OF A MOTOR

(71) Applicant: Microchip Technology Incorporated, Chandler, AZ (US)

(72) Inventor: Jason M. Sachs, Chandler, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 98 days.

(21) Appl. No.: 18/046,808

(22) Filed: Oct. 14, 2022

(65) Prior Publication Data

US 2023/0236004 A1    Jul. 27, 2023

Related U.S. Application Data

(60) Provisional application No. 63/267,204, filed on Jan. 27, 2022.

(51) Int. Cl.
| | | |
|---|---|---|
| *G01B 7/30* | (2006.01) | |
| *H02P 21/18* | (2016.01) | |
| *H02P 21/22* | (2016.01) | |

(52) U.S. Cl.
CPC ............... *G01B 7/30* (2013.01); *H02P 21/18* (2016.02); *H02P 21/22* (2016.02)

(58) Field of Classification Search
CPC .. H02P 21/18; H02P 21/22; H02P 6/16; H02P 6/185; H02P 6/28; H02P 21/14; H02P 2203/03; H02P 21/32; H02P 21/20; H02P 29/0241; H02P 2203/09; H02P 2205/05; H02P 21/16; H02P 2203/01; H02P 29/027; H02P 5/46; H02P 6/04; H02P 6/12; H02P 21/30; H02P 6/30; H02P 9/02; H02P 6/06; H02P 6/18; G01R 19/175; G01R 19/16538; G01R 19/0092; G01R 31/343; G01R 15/181; G01R 33/06; G01R 31/006; H02N 15/00; G01P 3/00; G01P 3/487; G01P 15/105; G01P 3/488; G01B 7/30
See application file for complete search history.

(56) References Cited

U.S. PATENT DOCUMENTS

| | | | | |
|---|---|---|---|---|
| 3,883,785 | A * | 5/1975 | Fulcher | H02P 6/06 318/400.04 |
| 5,461,293 | A * | 10/1995 | Rozman | H02K 29/06 318/801 |
| 9,431,945 | B2 * | 8/2016 | Thomas | H02P 25/08 |

(Continued)

OTHER PUBLICATIONS

International Search Report for International Application No. PCT/US2022/078159, mailed Jan. 18, 2023, 4 pages.

(Continued)

*Primary Examiner* — Vinh P Nguyen
(74) *Attorney, Agent, or Firm* — TraskBritt (57) ABSTRACT

One or more examples relate, generally, to reducing error in estimated angular position of a rotor of a motor. In one example, a method comprises generating an error signal indicating error in the estimated angular position; determining an adjustment amount associated with an estimated torque-producing component of motor winding current of a stator of the motor; generating an adjustment signal corresponding to the determined adjustment amount; and combining the error signal and the adjustment signal to generate a corrected error signal.

17 Claims, 8 Drawing Sheets

(56) References Cited

U.S. PATENT DOCUMENTS

| | | | |
|---|---|---|---|
| 9,463,714 B2* | 10/2016 | Goedert | B60N 2/7094 |
| 9,897,466 B2* | 2/2018 | Walters | H02P 21/06 |
| 10,879,821 B2* | 12/2020 | Lakshmi Narasimha | H02P 21/32 |
| 2012/0062160 A1 | 3/2012 | Yang et al. | |
| 2020/0169204 A1 | 5/2020 | Lakshmi Narasimha et al. | |
| 2023/0128564 A1* | 4/2023 | Sachs | H02P 21/22 318/400.02 |

OTHER PUBLICATIONS

International Written Opinion for International Application No. PCT/US2022/078159, mailed Jan. 18, 2023, 5 pages.

Podder Aveek et al: "Study of Sensorless 1-17 Field-Oriented Control of SPMSM Using Rotor Flux Observer & Disturbance Observer Based Discrete Sliding Mode Observer", 2021 IEEE 22nd Workshop on Control and Modelling of Power Electronics (COMPEL),.IEEE, Nov. 2, 2021, pp. 1-8.

Tejan, Kumar et al: "Rotor Position Sensorless Technique using High-Speed Sliding Mode Observer for PMSM Drive," 2021 IEEE Industry Applications Society Annual Meeting (IAS), IEEE, Oct. 10, 2021 (Oct. 10, 2021), pp. 1-8.

Ye, Shuaichen et al., "An Enhanced SMO-Based Permanent-Magnet Synchronous Machine Sensorless Drive Scheme With Current Measurement Error Compensation," IEEE Journal of Emerging and Selected Topics in Power Electronics, IEEE, Piscataway, NJ, USA ,vol. 9, No. 4, Nov. 20, 2020, pp. 4407-4419.

* cited by examiner

REDUCING ERROR IN ESTIMATED ANGULAR POSITION OF A ROTOR OF A MOTOR

CROSS REFERENCE TO RELATED APPLICATIONS

This application claims the benefit of the priority date of U.S. Provisional Patent Application No. 63/267,204, filed Jan. 27, 2022, and titled "ERROR COMPENSATION FOR STATOR FLUX SATURATION IN SELF-SENSING ANGLE ESTIMATION," the entire contents and disclosure of which is incorporated herein by this reference.

FIELD

This application relates generally to permanent magnet synchronous motors or brushless DC electric motors. Some examples relate to sensorless commutation angle estimation for electric motors. Some examples relate to reducing error in estimated angular position of a rotor of a motor.

BACKGROUND

Some electric motors, such as permanent magnet synchronous motors or brushless direct current electric motors, may be controlled using "sensorless" field-oriented control (FOC). The "sensorless" in sensorless FOC refers to an approach where characteristics of an electric motor, such as motor speed or rotor position, are derived rather than measured directly using sensors on the motor. Generally, such derivations should be precise for efficiency and high performance of the motor.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logic, blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is to execute computing instructions (e.g., software code) related to examples.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Electric motors (including e.g., permanent magnet synchronous motors and brushless direct current electric motors, without limitation) may generate magnetic fields in a stator to cause a rotor to rotate. The stator may include separate windings of wire positioned around an axis in which the magnetic fields are generated. The rotor may be, or may include, a magnet arranged to rotate around the axis responsive to the generated magnetic fields. As a non-limiting example, a three-phase electric motor may generate, in series, magnetic fields at three stator windings radially spaced around the axis. The magnetic fields may variously attract and repel the magnetic poles of the rotor which may cause the rotor to rotate within the stator windings. The electric motor may supply varying degrees of current to the various stator windings via connections (e.g., terminals, without limitation) at different times such that the generated magnetic fields will cause the rotor to rotate.

A rotating frame of reference may be defined based on the rotor. In the rotating frame of reference, a direct axis (or "d-axis") may be defined in the direction of one of the poles (e.g., the north pole, without limitation) of the magnet of the rotor. The d-axis component of stator magnetic flux is in the same direction as the rotor magnetic flux. The d-axis component of stator current causes stator flux along the d-axis.

A quadrature axis (or "q-axis") may be defined perpendicular to the direct axis. The q-axis component of stator magnetic flux is perpendicular to the direction of rotor magnetic flux and produces torque on the rotor in a positive direction (e.g., counterclockwise facing the drive end of the rotor shaft, without limitation). The q-axis component of stator current causes stator flux along the q-axis.

In simplistic terms, the d-axis is the main flux producing direction, while the q-axis is the main torque producing direction. In order to generate maximum, or improved, torque, the stator should generate magnetic fields in the stator windings according to the q-axis—e.g., the maximum magnetic field in the stator windings should align with the q-axis, without limitation.

As used herein, the term "commutation" (and like terms) refers to a process of translating between an electrical angular position of a rotor (or the d-axis or q-axis) and amounts of current to provide to different stator windings. As used herein, the term "commutation angle" (and like terms) refers to an angle of a magnetic field (i.e., a magnetic field generated by stator windings according to various currents provided thereto) relative to a stationary reference, as a non-limiting example, one of the stator windings.

"Electrical angle" may be determined according to any suitable convention without exceeding the scope of this disclosure. As a non-limiting example, "electrical angle" may be defined in terms of relative to a stationary reference, and the electrical angle of the rotor refers to the position of the rotor magnetic flux relative to that stationary reference. An electrical angle of zero corresponds to the rotor magnetic flux being in the same direction as the stator flux caused by a particular distribution of current in the windings (for example, 1 ampere flowing into phase A, and 0.5 amperes flowing out of each of phases B and C, without limitation), known as the "alpha" axis in the stationary reference frame. An electrical angle of 90 degrees corresponds to the rotor magnetic flux being in the same direction as the stator flux caused by another particular distribution of current in the windings (for example, no current flowing into phase A, 0.866 ampere flowing into phase B, and 0.866 ampere flowing out of phase C, without limitation), known as the "beta" axis in the stationary reference frame. Any arbitrary electrical angle θ may be determined by the components of rotor flux along the alpha and beta axes, such that these components are in proportion to cos θ and sin θ, respectively.

As a further non-limiting example, "electrical angle" may be defined in terms of mechanical angle multiplied by the number of pole pairs, where the mechanical angle is defined as the angular position of the rotor relative to a reference position; typically this reference position is such that the rotor magnetic flux is in the same direction as the stator flux caused by a particular distribution of current in the windings a particular distribution of current in the windings (for example, 1 ampere flowing into phase A, and 0.5 amperes flowing out of each of phases B and C, without limitation), again, known as the "alpha" axis in the stationary reference frame, as mentioned above. Positive angular rotation is defined in one particular direction, for example counter-clockwise as viewed looking towards the drive end of the motor.

To control the rotor, it may be important to know the angular position of the rotor relative to the stator windings. As a non-limiting example, knowing the angular position of the rotor may be relevant to determining which of the stator windings to supply with which amounts of positive and negative current in order to provide maximum torque at the rotor. Sometimes sensors are added to an electric motor to determine the angular position of the rotor and provide it to the motor drive, however, such sensors add cost or complexity of an electric motor and may reduce reliability as the sensor and connections thereto may degrade or fail. Some electric motors are sensorless, and the motor drive uses derivations (i.e., estimations) of characteristics of an electric motor, such as angular position of a rotor, motor speed, or rotor position. Commutation angle estimators, such as saliency-based sensorless commutation-angle-estimators, may be utilized to estimate an angular position of a rotor.

Sensorless field-oriented control (FOC) of permanent magnet synchronous motors (PMSM) may use sensorless commutation angle estimators based on magnetic saliency of a rotor. A typical saliency-based estimator includes excitation generators, gain stages, correlators, and phase-locked loops. In a typical arrangement, an excitation signal is added to a current-control signal to generate a reliably observable response in motor winding currents (e.g., in one or more components of motor winding currents, without limitation), and information about an observed response may be utilized to determine error in estimated angular position of the rotor of a motor.

In saliency-based estimators, a large error in estimated angular position is generally undesirable because it may result in reduced motor torque or torque in a wrong direction causing instability at a sensorless FOC PMSM. The inventor of this disclosure appreciates that, in saliency-based estimators, a portion of error in estimated angular position may be due to sensitivity, in the calculation of error in estimated angular position, to q-axis current $I_q$, and such sensitivity may, at least partially, be due to effects of stator magnetic saliency. Reducing error in estimated angular position in accordance with one or more examples may compensate, at least in part, for effects of stator magnetic saliency. Reducing error in estimated angular position in accordance with one or more examples may increase one or more of: torque, efficiency, stability, or usable range of current in electric motors that utilize sensorless magnetic saliency-based angle estimators.

The inventor of this disclosure appreciates that at least some of the effects of stator magnetic saliency may be reflected in sensitivity of error in estimated angular position to q-axis current $I_q$ in a manner that may be observed (e.g., measured to determine a representative value, without limitation) and reduced (e.g., compensated, without limitation).

For an ideal electric motor, error signal ε may be expressed as: $\varepsilon = A_1 \sin 2\theta_{err}$ (Equation 1), where $A_1$ is a gain that is proportional to an excitation signal amplitude and is dependent on other system parameters such as the motor d-axis inductance, q-axis inductance, and excitation frequency; and $\theta_{err}$ is error in estimated angle (also referred to herein as "angle error").

Real electric motors are typically, if not always, non-ideal in various ways, and so an error signal ε may have or exhibit unwanted sensitivities to quantities other than angle error $\theta_{err}$, such as one or more of $I_d$, $I_q$, or electrical angle θ, without limitation. For some non-ideal electric motors, error signal ε may be expressed as $\varepsilon = A_1 f(\theta_{err}, I_d, I_q, \theta)$, where function $f( )$ is a correlation function expressing a relationship between error signal ε and one or more of angle error $\theta_{err}$, $I_d$, $I_q$, or electrical angle θ. The relationship expressed by function $f( )$ may be different for different electric motors, e.g., due to manufacturing tolerances or environmental conditions such as temperature, without limitation. One or more examples relate, generally, to compensation of aforementioned sensitivities in angle error $\theta_{err}$ or error signal ε, more generally, due to $I_q$.

Figure 1:
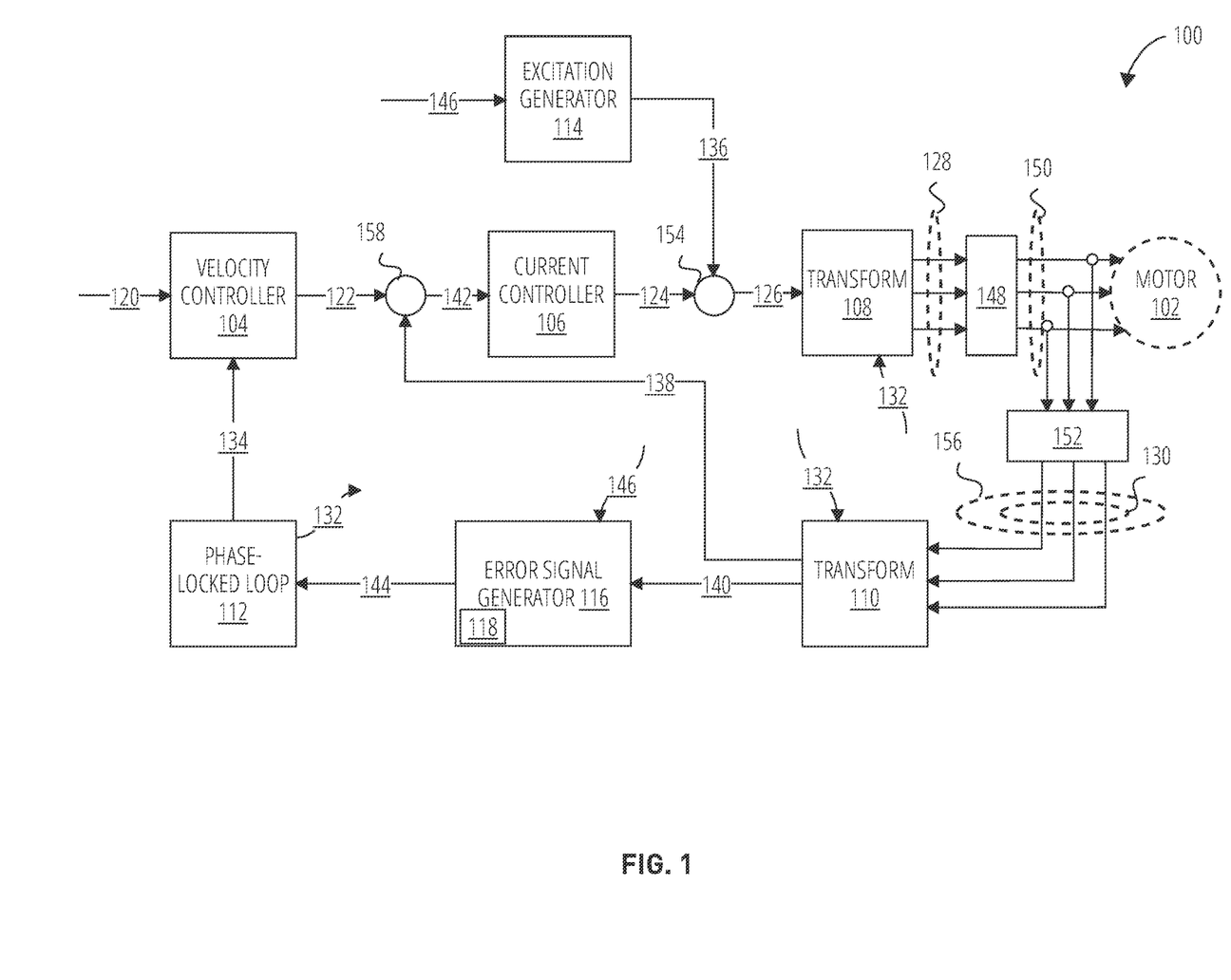
FIG. 1 is a block diagram depicting an apparatus to control, via saliency-based sensorless commutation-angle-estimation, an electric motor, in accordance with one or more examples.

FIG. 1 is a block diagram depicting an apparatus 100 to control, via saliency-based sensorless commutation-angle-estimation, an electric motor, in accordance with one or more examples.

Apparatus 100 may include an optional motor 102, a velocity controller 104, a current controller 106, a transform 108, a transform 110, a phase-locked loop 112, an excitation generator 114, and an error signal generator 116. Apparatus 100 may be characterized as an electric motor system, or portion thereof, in examples of apparatus 100 that include a motor 102. Apparatus 100 may be characterized as an electric motor control system, or portion thereof, in examples of apparatus 100 that do not include a motor 102.

Motor 102 may be an electric motor that includes a rotor and a stator (rotor and stator not depicted by FIG. 1), as non-limiting examples, a permanent magnet synchronous motor (PMSM) or a brushless direct current (BLDC) electric motor. A stator of motor 102 may include any suitable number of stator windings. As non-limiting examples, motor 102 may be a two-phase electric motor, a three-phase electric motor, or a four-phase electric motor.

Velocity controller 104 generates a current command signal 122 at least partially in response to velocity-command signal 120 and velocity feedback 134. Velocity controller 104 generates current command signal 122 to generate a motor winding current suitable to urge a rotational velocity of motor 102 toward a desired rotational velocity specified by velocity-command signal 120, as discussed below. In one or more examples, velocity controller 104 may receive velocity-command signal 120 from a source external to apparatus 100 (source of velocity-command signal 120 not depicted) and receive a velocity feedback 134 from phase-locked loop 112. Velocity-command signal 120 may be indicative of a desired rotational velocity of a rotor of motor 102. Velocity feedback 134 may indicate an estimated rotational velocity of the rotor of motor 102.

Current controller 106 generates voltage command signal 124 to control magnitude and phase of motor winding currents (motor winding currents not depicted by FIG. 1) of a stator of motor 102 to drive current error signal 142 toward zero, or, equivalently, to drive the current response signal $I_{dq}$ 138 toward current command signal 122. The motor winding currents control torque production via interaction of rotor and stator fields. Torque production is the force that causes the rotational motion of the rotor of the motor 102. Thus, current controller 106 controls rotational torque of the motor 102. Current error signal 142 is a difference between current command signal 122 and current response signal $I_{dq}$ 138, generated as discussed below, to generate voltage command signal 124.

Excitation generator 114 generates excitation voltage 136, which is combined (e.g., summed or utilized to modulate, without limitation) with voltage command signal 124 by summer 154 to generate modulated voltage command signal 126. Modulated voltage command signal 126 is utilized by transform 108 to generate multi-phase voltage command signal(s) 128 for motor 102.

Excitation generator 114 generates excitation voltage 136 at least partially in response to excitation signal 146. Excitation signal 146 is a unit signal (e.g., a voltage signal with an amplitude of 1 volt, without limitation) with a predetermined frequency and predetermined waveform. Excitation generator 114 utilizes excitation signal 146 to generate excitation voltage 136 exhibiting the waveform and frequency of excitation signal 146. In one or more examples, excitation signal 146 may be a square wave with a frequency higher than a bandwidth of the phase-locked loop 112, and the same or higher than a frequency of the motor winding currents. Excitation generator 114 may generate excitation voltage 136 with an amplitude that is the same as, or different than, the amplitude of excitation signal 146 depending on operating conditions.

Voltage command signal 124 is combined with excitation voltage 136 by summer 154 to add a measurement signal to voltage command signal 124 to permit observation of the response of motor 102 to multi-phase voltage command signals 128 (e.g., via multi-phase current response signal(s) 130, without limitation) as discussed below.

Transform 108 generates multi-phase voltage command signal(s) 128 (e.g., an A, B, and C signal for three stator windings of a three-phase motor, without limitation) in response to modulated voltage command signal 126. Multi-phase voltage command signal(s) 128 are voltage signals to drive a stator of motor 102 and thereby induce a magnetic field that imparts rotational force on a rotor of motor 102. Driver circuit 148 applies multi-phase voltage command signal(s) 128 to motor 102 as voltage signals ("driven multi-phase control signals 150").

In one or more examples, transform 108 may translate between a d/q frame of reference (e.g., a d-axis/q-axis frame of reference, without limitation) of modulated voltage command signal 126 and a multi-phase frame of reference of multi-phase voltage command signal(s) 128 (e.g., an ABC frame of reference for a three-phase motor, without limitation). As a non-limiting example, transform 108 may perform inverse Park and Clarke transforms to translate modulated voltage command signal 126 from a d/q frame of reference to a multi-phase frame of reference (e.g., an ABC frame of reference, without limitation) and provide individual voltage signals of multi-phase voltage command signal(s) 128 to drive respective stator windings of a stator of motor 102.

In one or more examples, transform 108 may further include a realizer (e.g., a space vector modulator or zero-sequence modulator, without limitation) to adjust common-mode offset of multi-phase voltage outputs and ensure they are limited within realizable voltage limits. In one or more examples, driver circuit 148 may include a pulse-width modulator (not depicted) to provide pulse-width modulated voltage (or current) to the stator windings in response to the multi-phase voltage command signal(s) 128 generated by transform 108.

Current sensor 152 obtains multi-phase motor winding current samples 156 (also referred to herein as "motor winding current samples 156"), which include multi-phase current response signal(s) 130.

Multi-phase current response signal(s) 130 represents motor winding currents generated in response to driven multi-phase control signals 150. In one or more examples, current sensor 152 samples current(s) at inputs to stators of motor 102 for receiving driven multi-phase control signals 150. The samples represent multi-phase current (e.g., current level(s) of multi-phase current, without limitation) through respective stator windings of motor 102, such currents generated in response to voltage signals provided to the stator windings of motor 102.

Transform 110 generates a d/q current response signal 138 (also referred to herein as "current response signal $I_{dq}$ 138"), at least partially in response to multi-phase current response signal(s) 130. In one or more examples, transforms 110 may include an analog-to-digital converter (ADC) to convert measured analog values (e.g., sampled analog voltages, without limitation) at the inputs of the stator windings of motor 102 by current sensor 152 into digital values. Transform 110 may translate from the 'ABC' frame of reference of the inputs of the stator windings of motor 102 to a d/q frame of reference. As a non-limiting example, transform 110 may include Park and Clarke transforms to translate the sampled multi-phase current response signal(s) 130 into current response signal $I_{dq}$ 138 that represents the current response signal in terms of a d-axis component and a q-axis component. Transform 110 may generate current response signal $I_{dq}$ 138 at least partially based on an estimated angular position of the rotor (e.g., "estimated angular position 132") generated by phase-locked loop 112, as a non-limiting example, in a same or previous execution cycle of error signal generator 116. While not depicted, in one or more examples, transform 110 may include gain or offset compensation to address gain or offset introduced between transform 108 and transform 110.

As discussed above, a portion of multi-phase current response signal(s) 130 and, thus, a portion of current response signal $I_{dq}$ 138 may be generated at least partially in response to excitation voltage 136. The portion includes information about an error in an estimated angular position of a rotor of a motor that may be utilized by phase-locked loop 112 to generate velocity feedback 134 or estimated angular position 132.

In one or more examples, error signal generator 116 generates corrected error signal 144 for phase-locked loop 112. Corrected error signal 144 is indicative of the error in estimated angular position of a rotor of a motor. Error signal generator 116 generates corrected error signal 144 at least partially in response to estimated q-axis current component 140 (a non-limiting example of an estimated torque-producing current component), excitation signal 146, and an adjustment amount provided by error compensator 118, discussed below.

Estimated q-axis current component 140 is an estimate of the q-axis component of a d/q representation of motor winding current, calculated by transform 110 utilizing motor winding current samples 156. A portion of estimated q-axis current component 140 generated in response to excitation voltage 136 may be relatable to error in estimated angular position. As discussed above, due to effects of stator magnetic saliency on multi-phase current response signal(s) 130, the portion of estimated q-axis current component 140 generated in response to excitation voltage 136 may not accurately represent error in estimated angular position. In one or more examples, error compensator 118 of error signal generator 116 assists, as discussed below, with generating corrected error signal 144 for improved indication of error in estimated angular position. In one or more examples, error compensator 118 may reduce, within corrected error signal 144, at least some effects of stator magnetic saliency on multi-phase current response signal(s) 130.

Phase-locked loop 112 generates the estimated angular position 132 of the rotor (i.e., "estimated angular position 132") at least partially responsive to corrected error signal 144. Phase-locked loop 112 may provide velocity feedback 134 to velocity controller 104. Phase-locked loop 112 may determine estimated angular position 132 which may be an estimated angular position of the rotor based on corrected error signal 144. Phase-locked loop 112 may provide estimated angular position 132 to transform 108 and to transform 110 so that transform 108 and transform 110 may respectively utilize the estimated angular position 132 to translate between the d/q frame of reference and the ABC frame of reference. Phase-locked loop 112 may further generate velocity feedback 134 and provide velocity feedback 134 to velocity controller 104. Phase-locked loop 112 may track a rotational position of the rotor of motor 102 by observing corrected error signal 144 or by providing velocity feedback 134, in accordance with one or more examples.

Figure 2:
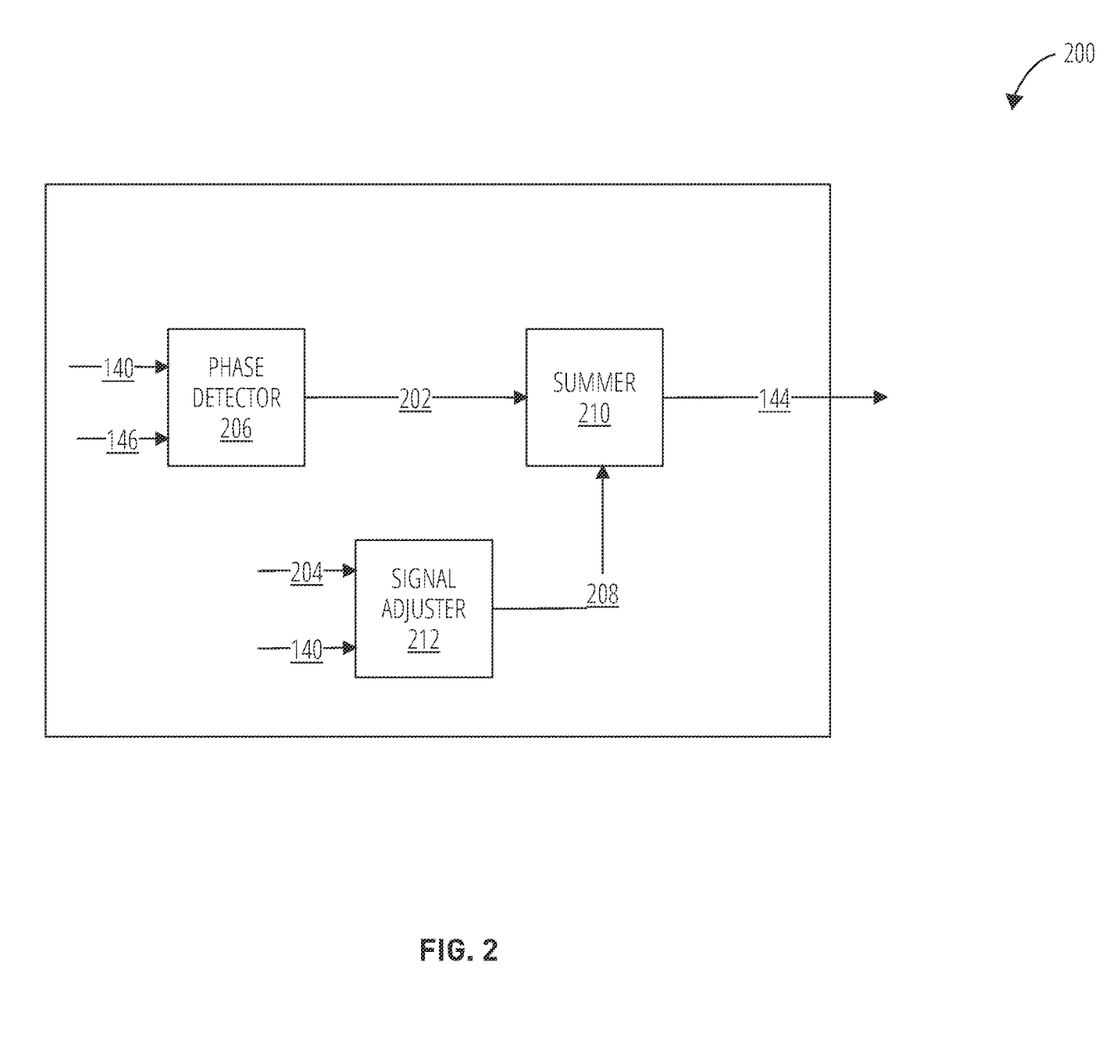
FIG. 2 is a block diagram depicting an apparatus to generate an error signal with improved indication of error in estimated angular position, in accordance with one or more examples.

FIG. 2 is a block diagram depicting an apparatus 200 to generate an error signal with improved indication of error in estimated angular position, in accordance with one or more examples. Apparatus 200 is a non-limiting example of an error signal generator 116 of FIG. 1 and may be further characterized as an "error signal generator 200."

Apparatus 200 may include a phase detector 206, a signal adjuster 212 and a summer 210.

Phase detector 206 receives a q-axis current component 140 of current response signal $I_{dq}$ 138 (i.e., estimated q-axis current component 140) and excitation signal 146, and generates a first, uncorrected, error signal 202, indicative of error in estimated angular position. In one or more examples, phase detectors 206 demodulates estimated q-axis current component 140 utilizing excitation signal 146 as the demodulating signal to obtain the q-axis component of a signal generated in response to excitation voltage 136 (i.e., to obtain the q-axis component of the response signal). Information about the response signal (e.g., amplitude of the demodulated estimated q-axis current component 140, without limitation) may be utilized to determine/calculate error in estimated angular position, which determination is included in first error signal 202.

As discussed above, error in estimated angular position indicated by first error signal 202 may be inaccurate at least partially due to sensitivity, in the calculation of estimated angular position, to q-axis current $I_q$. Accordingly, first error signal 202, may not suitably represent error in angular position of a rotor of a motor.

Signal adjuster 212 determines an adjustment signal 208 responsive to one or more predetermined adjustment amounts 204 associated with estimated q-axis current component 140. In one or more examples, stator saliency effects exhibited by motor 102, or examples thereof, may be determined at least partially based on testing of apparatus 200 to observe effects of stator magnetic saliency or other non-linearities, as a non-limiting example, upon manufacturing. Values of predetermined adjustment amounts 204 that compensate for effects of stator magnetic saliency or other non-linearities observed during testing may be associated with observed motor winding currents (e.g., magnitudes of observed motor winding currents, without limitation) and stored, as a non-limiting example, in a look-up-table (LUT), as one or more functions to calculate adjustment amounts at least partially based on observed motor winding current. Signal adjuster 212 may be a logic circuit, such as a combinational logic circuit or a logic circuit that executes firmware.

Corrected error signal 144 is generated at least partially in response to first error signal 202 and adjustment signal 208 (and may also be referred to herein as a "second error signal 144"). Summer 210 generates corrected error signal 144 to represent a difference between adjustment signal 208 and first error signal 202.

In one or more examples, phase detector 206 may include a finite impulse response (FIR) filter with coefficients for weighting past samples of observed motor winding currents (e.g., estimated q-axis current component 140, without limitation) so that an output of phase detector 206 is a signal relating the coefficients with past samples. Similarly, by way of non-limiting example, if signal adjuster 212 applies a linear gain to estimated q-axis current component 140, then additional coefficients may be utilized to implement a calculation to adjust the estimated q-axis current component 140.

In some examples, the coefficients of a FIR filter of phase detector 206 and the coefficients of the FIR filter of the signal adjuster 212 may be combined into a single set of coefficients. In such a scenario, phase detector 206, signal adjuster 212, and summer 210 may be combined into a single device, circuit, or block to process and correct errors in estimation of estimated q-axis current component 140. In one or more examples, values of the combined coefficients may be pre-determined and stored, which may reduce computation time and space on a device.

Figure 3:
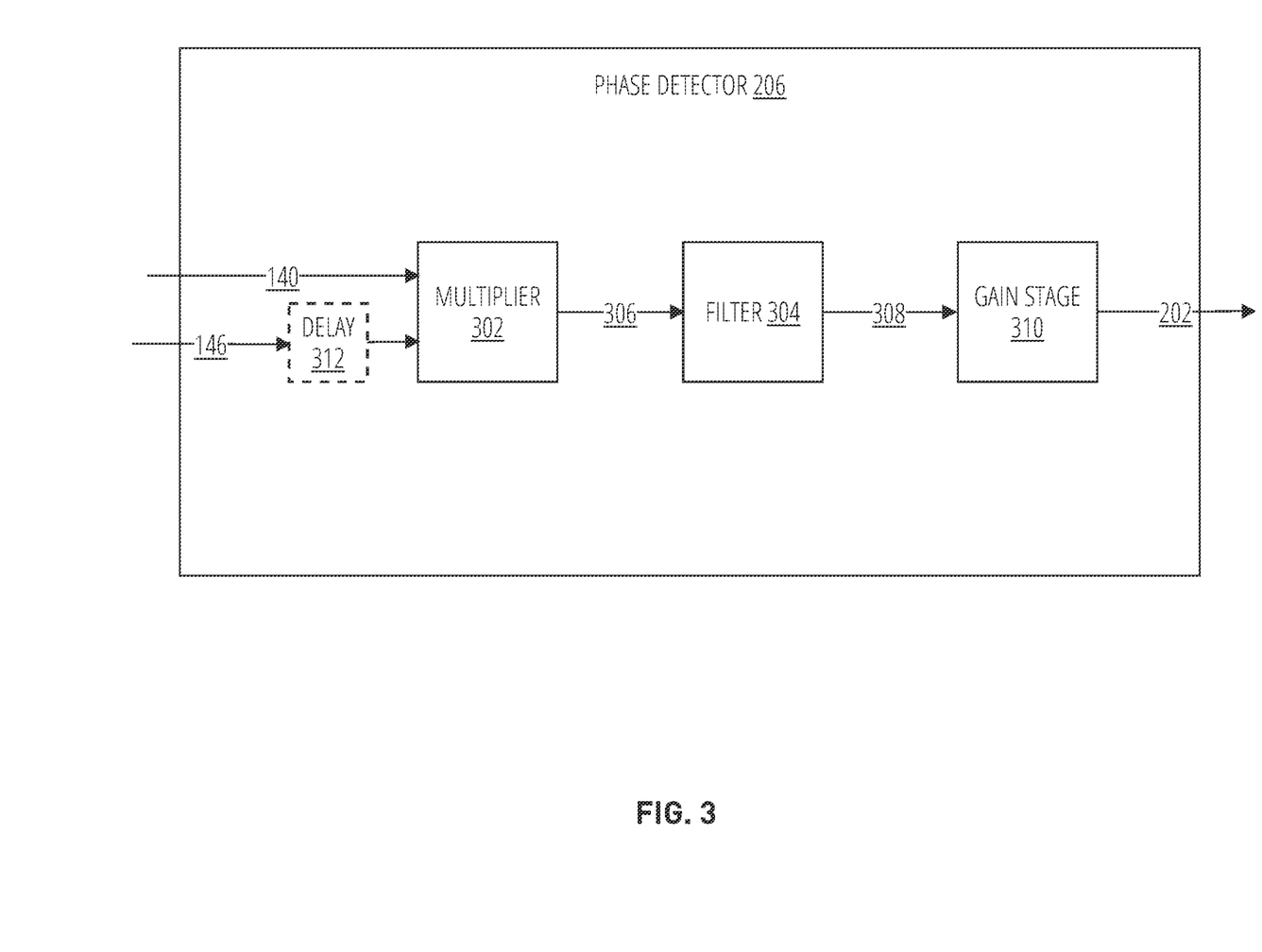
FIG. 3 is a block diagram depicting an example of phase detector to generate a first error signal indicative of error in estimated angular position for further correction, in accordance with one or more examples.

FIG. 3 is a block diagram depicting an example of phase detector 206 to generate a first error signal 202 indicative of error in estimated angular position for further correction, in accordance with one or more examples.

Phase detector 206 may include a multiplier 302, a filter 304, and a gain stage 310 (which may also be referred to herein as a "gain circuit 310"). Multiplier 302 may receive estimated q-axis current component 140 and excitation signal 146.

Multiplier 302 combines estimated q-axis current component 140 and excitation signal 146 to obtain q-axis response signal 306. Multiplication is a non-limiting example of heterodyning that may be utilized to demodulate a signal. Heterodyning frequency shifts the q-axis response signal from the higher frequency of the excitation signal 146 to a lower frequency. Filter 304 is a low-pass filter which passes low-frequency components or attenuates high-frequency components of q-axis response signal 306. Filter 304 passes the lower-frequency components of q-axis response signal 306, namely, a time-varying amplitude of the motor-current response to the excitation voltage 136.

The output of filter 304 is a signal 308 representing low-frequency components. Signal 308 is passed to gain circuit 310 where signal 308 is multiplied by a gain. In one or more examples, the gain applied by gain circuit 310 may be chosen to make the error signal have a desired amplitude - - - for small error signals it will be proportional to the error in estimated angle - - - so that the phase-locked loop can be tuned consistently, and so that the PLL tuning constants are independent of factors such as excitation gain or motor parameters.

In one or more examples, phase detector 206 may include an optional delay 312 at an input of multiplier 302 in the signal path of excitation signal 146. Delay 312 may synchronize estimated q-axis current component 140 and excitation signal 146, as a non-limiting example, compensate for signal processing delays in a signal path of observed motor winding current by providing similar delays in the signal path of excitation signal 146.

Figure 4:
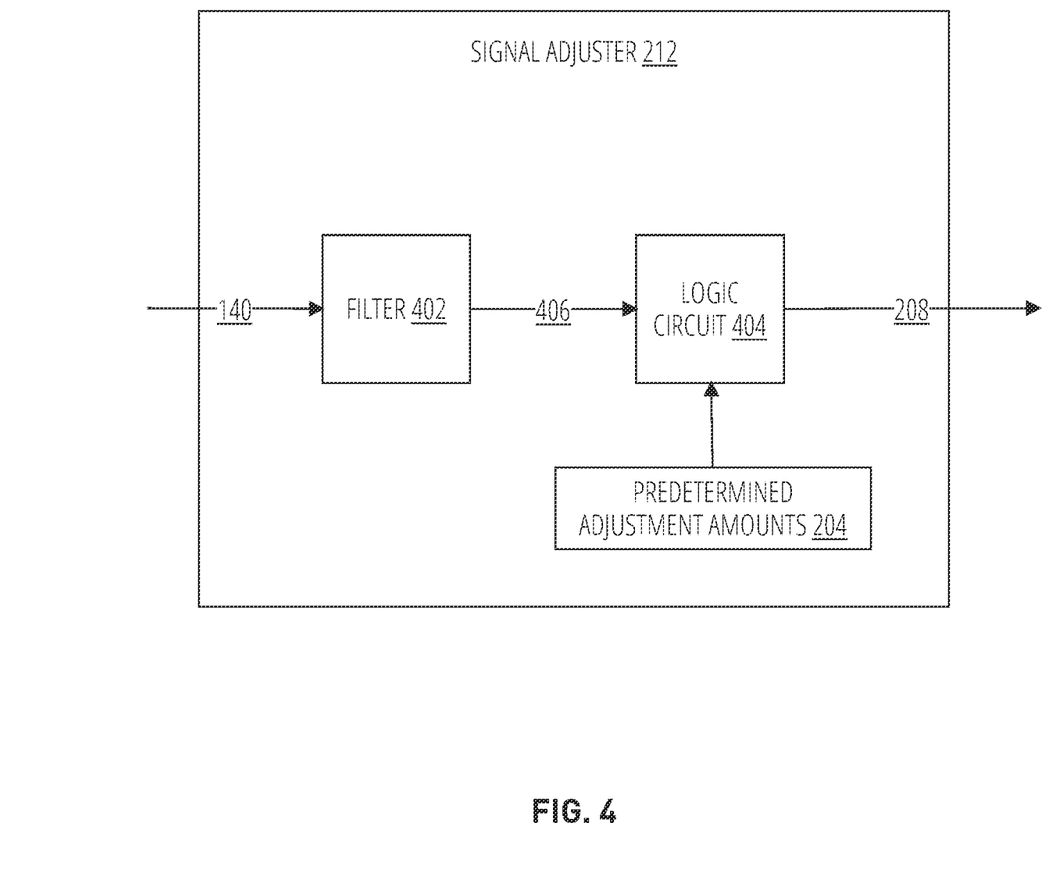
FIG. 4 is a block diagram depicting an example signal adjuster to generate a correction signal indicative of an adjustment amount to reduce effects of stator saliency on an error signal generated by a phase detector, in accordance with one or more examples.

FIG. 4 is a block diagram depicting an example signal adjuster 212 to generate a correction signal indicative of an adjustment amount to reduce effects of stator saliency on an error signal (e.g., first error signal 202) generated by phase detector 206, in accordance with one or more examples.

Signal adjuster 212 may receive a signal representing estimated q-axis current component 140, which may be directly passed to filter 402. Filter 402 may be a low-pass filter. The filter 402 may pass one or more low-frequency components of estimated q-axis current component 140, which is represented in FIG. 4 as frequency component 406. Frequency component 406 may be passed to logic circuit 404. Logic circuit 404 may determine and provide the adjustment signal 208 indicative of an adjustment amount of predetermined adjustment amounts 204 associated with frequency component 406. In one or more examples, predetermined adjustment amounts 204 and their relationships with respective frequency components, such as frequency component 406, may be determined during testing following manufacturing of the apparatus (e.g., apparatus 200, without limitation) and may be stored in a memory at, or accessible by, signal adjuster 212. In one or more examples, the logic circuit 404 may apply a linear gain to the frequency component 406. In instances where a linear gain is applied, the filter 402 may be an example of a finite impulse response (FIR) filter.

Figure 5:
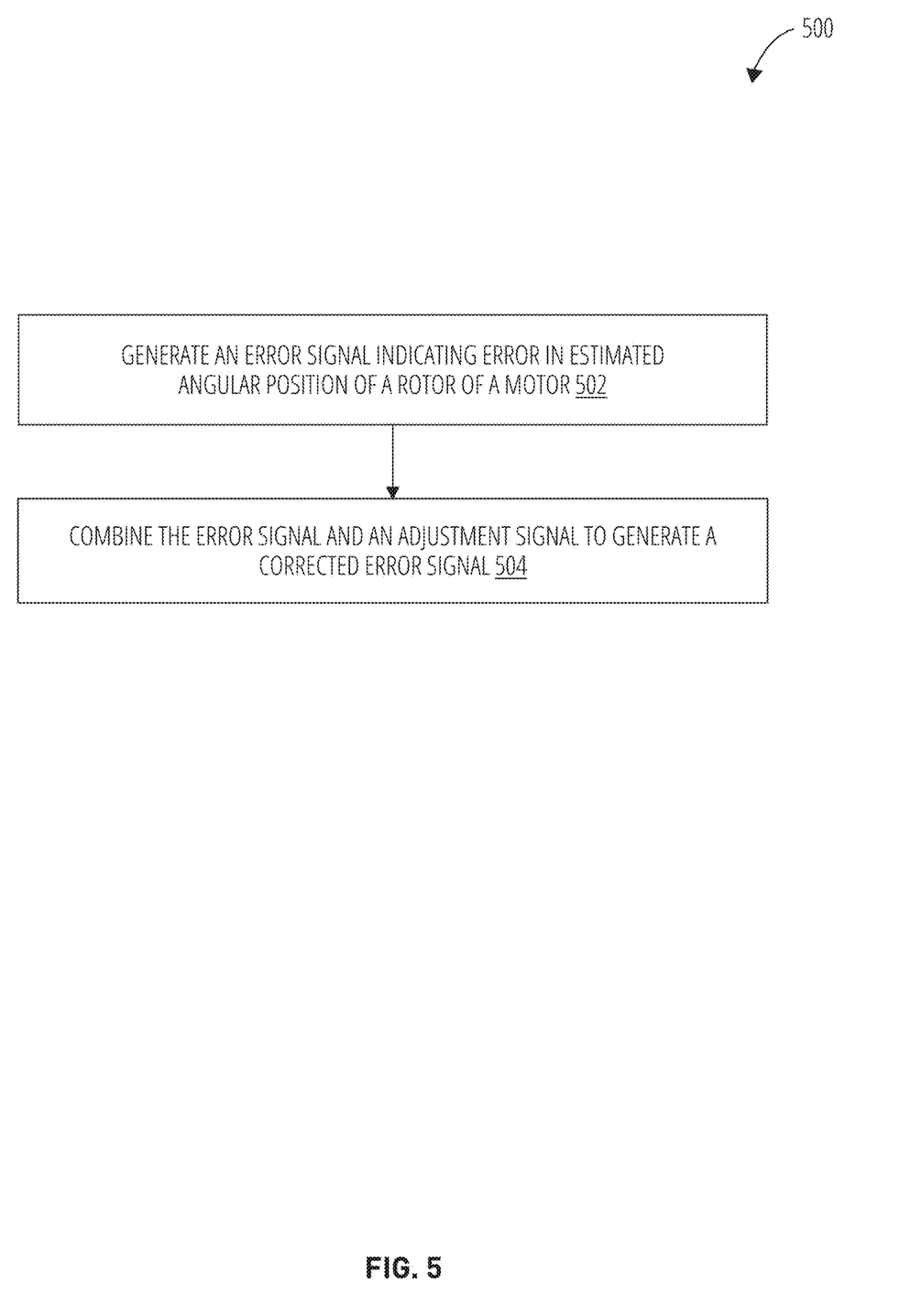
FIG. 5 is a flow diagram depicting a process to reduce error (e.g., magnitude of error, without limitation) in estimated angular position of the rotor of a motor, in accordance with one or more examples.

FIG. 5 is a flow diagram depicting a process 500 to reduce error (e.g., magnitude of error, without limitation) in estimated angular position of the rotor of a motor, in accordance with one or more examples.

Process 500 may be performed, as non-limiting examples, by error signal generator 116 or apparatus 200. Although illustrated as discrete blocks, various blocks may be divided into additional blocks, combined into fewer blocks, or eliminated, depending on the desired implementation.

At operation 502, process 500 generates an error signal (e.g., first error signal 202 of FIG. 2, without limitation) indicating error in estimated angular position of a rotor of a motor.

At operation 504, process 500 combines the error signal and an adjustment signal (e.g., adjustment signal 208 of FIG. 2, without limitation) to generate a corrected error signal (e.g., corrected error signal 144 of FIG. 1 or FIG. 2, without limitation).

Figure 6:
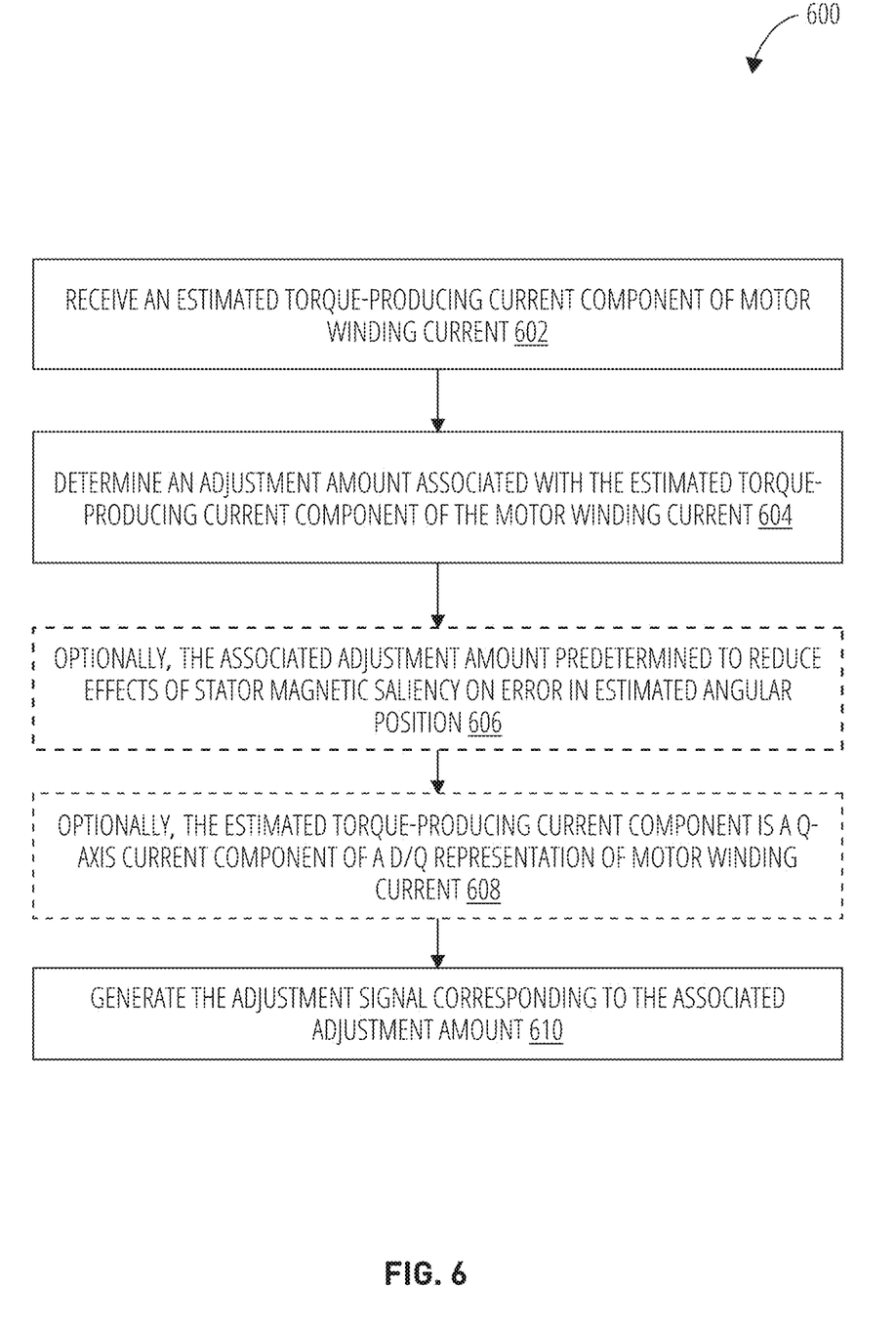
FIG. 6 is a flowchart depicting a process to generate an adjustment signal that may be combined with an error signal to generate a corrected error signal, in accordance with one or more examples.

FIG. 6 is a flowchart depicting a process 600 to generate an adjustment signal that may be combined with an error signal to generate a corrected error signal, in accordance with one or more examples.

Process 600 may be performed, as a non-limiting example, by signal adjuster 212 of FIG. 2 or error signal generator 116 of FIG. 1. Although illustrated as discrete blocks, various blocks may be divided into additional blocks, combined into fewer blocks, or eliminated, depending on the desired implementation.

At operation 602, process 600 receives an estimated torque-producing current component (e.g., estimated q-axis current component 140 of FIG. 1, without limitation) of a d/q representation of motor winding current (e.g., current response signal $I_{dq}$ 138 of FIG. 1, without limitation).

At operation 604, determining an adjustment amount (e.g., one of the adjustment amounts of predetermined adjustment amounts 204 of FIG. 2, without limitation) associated with the estimated torque-producing current component of the d/q representation of motor winding current.

At optional operation 606, the associated adjustment amount is predetermined to reduce effects of stator magnetic saliency on error in estimated angular position.

At optional operation 608, the estimated torque-producing current component is a q-axis current component of a d/q representation of motor winding current.

At operation 610, process 600 generates the adjustment signal corresponding to the associated adjustment amount.

Figure 7:
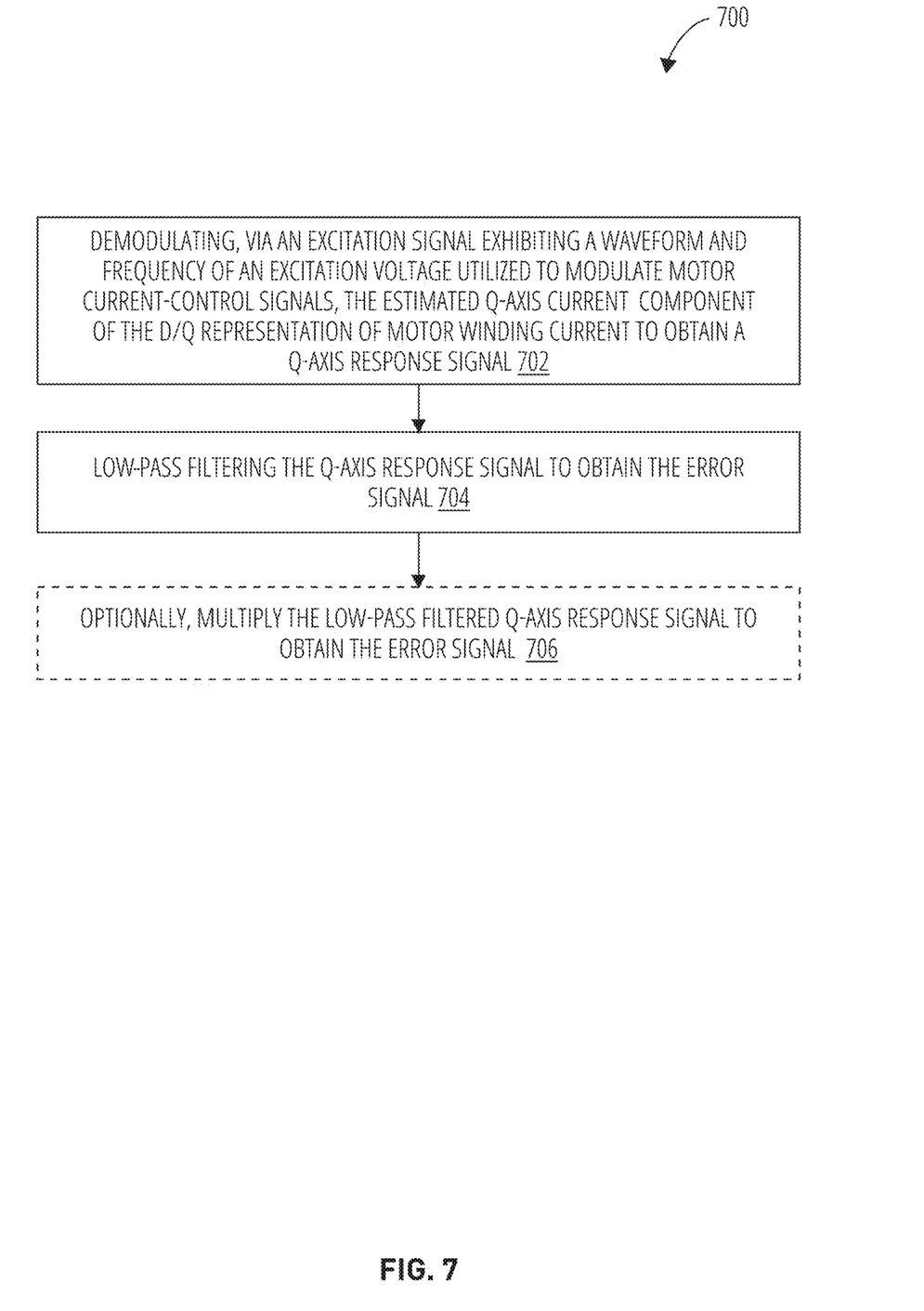
FIG. 7 is a flow diagram depicting a process to generate an error signal, which error signal may be utilized to generate a corrected error signal, thereby reducing error in estimated angular position, in accordance with one or more examples.

FIG. 7 is a flow diagram depicting a process 700 to generate an error signal, which error signal may be utilized to generate a corrected error signal, thereby reducing error in estimated angular position, in accordance with one or more examples.

In one or more examples, process 700 may be performed by error signal generator 116, apparatus 200, or phase detector 206, without limitation. Although illustrated as discrete blocks, various blocks may be divided into additional blocks, combined into fewer blocks, or eliminated, depending on the desired implementation.

At operation 702, process 700 demodulates the estimated q-axis current component of the d/q representation of motor winding current to obtain a q-axis response signal. For a demodulating signal, process 700 utilizes an excitation signal exhibiting a waveform and frequency of an excitation voltage utilized to modulate motor current-control signals.

At operation 704, process 700 low-pass filters the q-axis response signal to obtain an error signal (e.g., first error signal 202 of FIG. 2, without limitation). In various examples, error information may be included in q-axis response signal and recovered via low-pass filtering. For example, an amplitude of the q-axis response signal may be indicative of error in estimated angular position of a rotor of a motor in a system that utilizes saliency-based sensorless commutation-angle-estimation. More specifically, a difference between amplitude of a q-axis response signal and an excitation signal may be indicative of error in estimated angular position.

At optional operation 706, process 700 optionally multiplies the low-pass filtered q-axis response signal to obtain the error signal.

Figure 8:
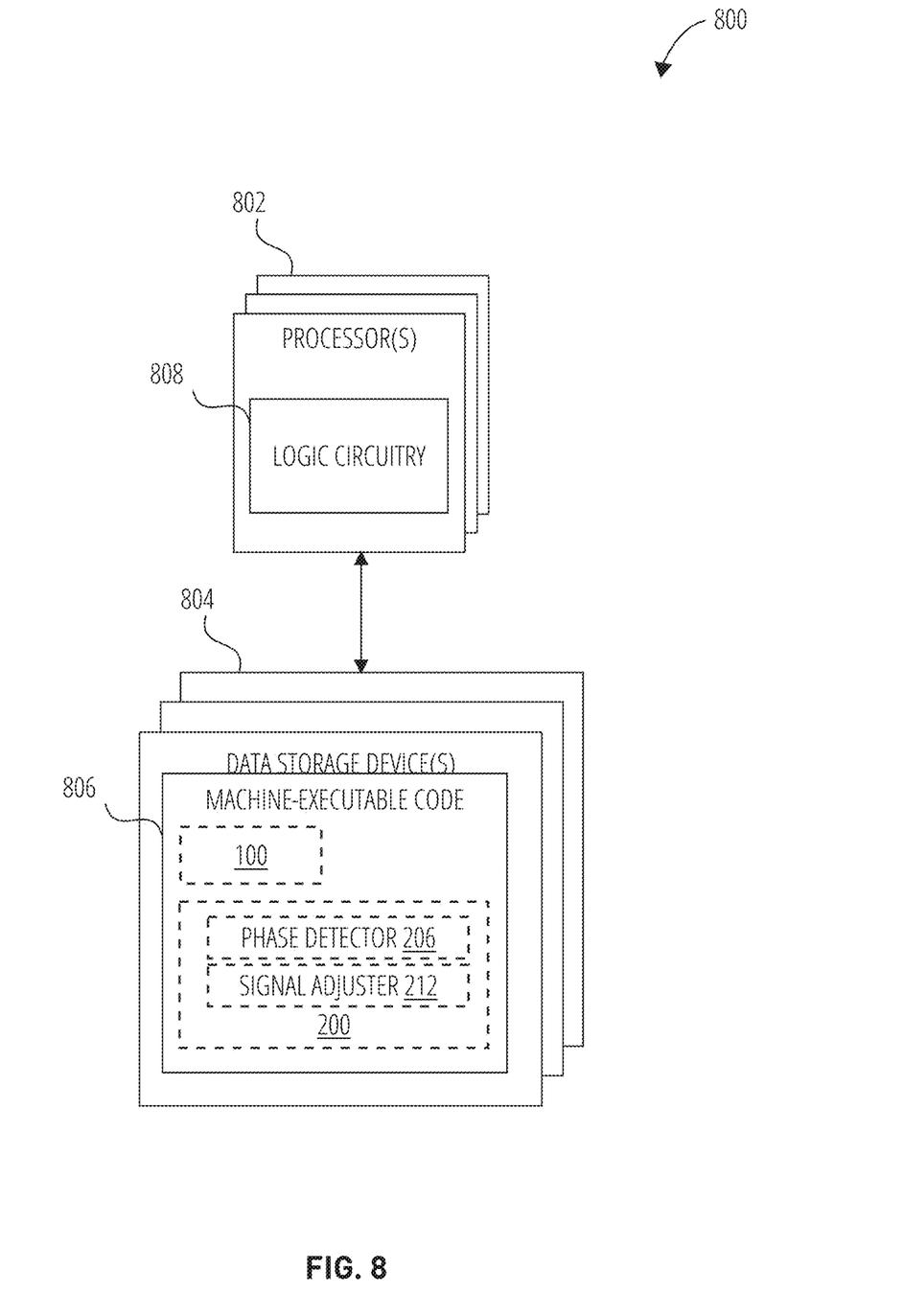
FIG. 8 is a block diagram of a device that, in one or more examples, may be used to implement various functions, operations, acts, processes, or methods disclosed herein.

FIG. 8 is a block diagram of a device 800 that, in one or more examples, may be used to implement various functions, operations, acts, processes, or methods disclosed herein. Device 800 includes one or more processors 802 (sometimes referred to herein as "processors 802") operably coupled to one or more apparatuses such as data storage devices (sometimes referred to herein as "storage 804"), without limitation. Storage 804 includes machine-executable code 806 stored thereon (e.g., stored on a computer-readable memory, without limitation) and processors 802 include logic circuitry 808. Machine-executable code 806 include information describing functional elements that may be implemented by (e.g., performed by, without limitation) logic circuitry 808. Logic circuitry 808 is implements (e.g., performs, without limitation) the functional elements described by machine-executable code 806. Device 800, when executing the functional elements described by machine-executable code 806, should be considered as special purpose hardware may carry out the functional elements disclosed herein. In one or more examples, processors 802 may perform the functional elements described by machine-executable code 806 sequentially, concurrently (e.g., on one or more different hardware platforms, without limitation), or in one or more parallel process streams.

When implemented by logic circuitry 808 of processors 802, machine-executable code 806 may adapt processors 802 to perform operations of examples disclosed herein. For example, machine-executable code 806 may adapt processors 802 to perform at least a portion or a totality of process 500 of FIG. 5, process 700 of FIG. 7, or process 600 of FIG. 6. As another example, machine-executable code 806 may adapt processors 802 to perform at least a portion or a totality of the operations discussed for apparatus 100, apparatus 200, and more specifically, one or more of velocity controller 104, current controller 106, transform 108, transform 110, phase-locked loop 112, excitation generator 114, error signal generator 116, phase detector 206, signal adjuster 212, summer 210, multiplier 302, filter 304, gain circuit 310, filter 402, logic circuit 404 or predefined relationship.

Processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 802 may include any conventional processor, controller, microcontroller, or state machine. Processors 802 may also be implemented as a combination of computing devices, such as a combination of a DSP and a microprocessor, a plurality of microprocessors, one or more microprocessors in conjunction with a DSP core, or any other such configuration.

In one or more examples, storage 804 includes volatile data storage (e.g., random-access memory (RAM), without limitation), non-volatile data storage (e.g., Flash memory, a hard disc drive, a solid-state drive, erasable programmable read-only memory (EPROM), without limitation). In one or more examples, processors 802 and storage 804 may be implemented into a single device (e.g., a semiconductor device product, a system on chip (SOC), without limitation). In one or more examples, processors 802 and storage 804 may be implemented into separate devices.

In one or more examples, machine-executable code 806 may include computer-readable instructions (e.g., software code, firmware code, without limitation). By way of non-limiting example, the computer-readable instructions may be stored by storage 804, accessed directly by processors 802, and executed by processors 802 using at least logic circuitry 808. Also, by way of non-limiting example, the computer-readable instructions may be stored on storage 804, transmitted to a memory device (not shown) for execution, and executed by processors 802 using at least logic circuitry 808. Accordingly, in one or more examples logic circuitry 808 includes electrically configurable logic circuitry.

In one or more examples, machine-executable code 806 may describe hardware (e.g., circuitry, without limitation) to be implemented in logic circuitry 808 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples machine-executable code 806 may include an HDL, an RTL, a GL description, a mask level description, other hardware description, or any combination thereof.

In examples where machine-executable code 806 includes a hardware description (at any level of abstraction), a system (not shown, but including storage 804) may implement the hardware description described by machine-executable code 806. By way of non-limiting example, processors 802 may include a programmable logic device (e.g., an FPGA or a PLC, without limitation) and the logic circuitry 808 may be electrically controlled to implement circuitry corresponding to the hardware description into logic circuitry 808. Also by way of non-limiting example, logic circuitry 808 may include hard-wired logic manufactured by a manufacturing system (not shown, but including storage 804) according to the hardware description of machine-executable code 806.

Regardless of whether machine-executable code 806 includes computer-readable instructions or a hardware description, logic circuitry 808 performs the functional elements described by machine-executable code 806 when implementing the functional elements of machine-executable code 806. It is noted that although a hardware description may not directly describe functional elements, a hardware description indirectly describes functional elements that the hardware elements described by the hardware description are capable of performing.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described with respect to certain illustrated examples, those of ordinary skill in the art will recognize and appreciate that the present disclosure is not so limited. Rather, many additions, deletions, and modifications to the illustrated and described examples may be made without departing from the scope of the disclosure as hereinafter claimed along with their legal equivalents. In addition, features from one example may be combined with features of another example while still being encompassed within the scope of the disclosure as contemplated by the inventor.

What is claimed is:

1. A method, comprising:
   generating an estimated angular position of a rotor of a motor;
   generating an error signal indicating error in the estimated angular position;
   determining an adjustment amount associated with an estimated torque-producing component of motor winding current of a stator of the motor;
   generating an adjustment signal corresponding to the determined adjustment amount;
   combining the error signal and the adjustment signal to generate a corrected error signal; and
   correcting the estimated angular position responsive to the corrected error signal.

2. The method of claim 1, wherein generating the error signal comprises generating the error signal responsive to the estimated torque-producing component of the motor winding current and an excitation signal exhibiting a waveform and frequency of an excitation voltage utilized to modulate motor current-control signals.

3. The method of claim 1, wherein generating the estimated angular position comprises generating the estimated angular position by a phase-locked loop, and correcting the estimated angular position comprises correcting the estimated angular position by the phase-locked loop.

4. The method of claim 1, wherein determining the adjustment amount associated with the estimated torque-producing component of the motor winding current comprises:
   calculating the adjustment amount at least partially based on one or more functions to calculate adjustment amounts that compensate for effects of stator magnetic saliency or other non-linearities.

5. The method of claim 1, wherein determining the adjustment amount associated with the estimated torque-producing component of the motor winding current comprises:
   calculating the adjustment amount at least partially based on applying a linear gain to one or more frequency components of the estimated torque-producing component of the motor winding current, the one or more frequency components of the estimated torque-producing component of the motor winding current passed by a low-pass filter.

6. The method of claim 1, wherein the adjustment amount is predetermined to reduce effects of stator magnetic saliency on error in estimated angular position.

7. The method of claim 1, wherein the estimated torque-producing component of the motor winding current includes a q-axis component of a d/q representation of the motor winding current.

8. The method of claim 7, wherein generating the error signal comprises:
   demodulating, via an excitation signal exhibiting a waveform and frequency of an excitation voltage utilized to modulate motor current-control signals, the estimated q-axis component of the d/q representation of motor winding current to obtain a q-axis response signal; and
   low-pass filtering the q-axis response signal to obtain the error signal to be corrected.

9. The method of claim 8, comprising:
   multiplying the low-pass filtered q-axis response signal with a fixed gain value to obtain the error signal.

10. An apparatus, comprising:
    a phase-locked loop to generate an estimated angular position of a rotor of a motor;
    a phase detector to generate an error signal indicating error in the estimated angular position;
    a signal adjuster to:
       receive an estimated torque-producing component of motor winding current of a stator of the motor;
       determine an adjustment amount associated with the estimated torque-producing component of the motor winding current; and
       generate an adjustment signal corresponding to the determined adjustment amount; and
    a summer to combine the error signal and the adjustment signal to generate a corrected error signal, wherein the phase-locked loop is to correct the estimated angular position responsive to the corrected error signal.

11. The apparatus of claim 10, wherein the phase detector is to generate the error signal responsive to the estimated torque-producing component of the motor winding current and an excitation signal exhibiting a waveform and frequency of an excitation voltage utilized to modulate motor current-control signals.

12. The apparatus of claim 10, wherein the signal adjuster to determine the adjustment amount associated with the estimated torque-producing component of the motor winding current by:
calculating the adjustment amount at least partially based on one or more functions to calculate adjustment amounts that compensate for effects of stator magnetic saliency or other non-linearities.

13. The apparatus of claim 10, wherein the signal adjuster to determine the adjustment amount associated with the estimated torque-producing component of the motor winding current by:
calculating the adjustment amount at least partially based on applying a linear gain to one or more frequency components of the estimated torque-producing component of the motor winding current, the one or more frequency components of the estimated torque-producing component of the motor winding current passed by a low-pass filter.

14. The apparatus of claim 10, wherein the adjustment amount is one of multiple adjustment amounts respectively predetermined to reduce effects of stator magnetic saliency on error in estimated angular position.

15. The apparatus of claim 10, wherein the estimated torque-producing component of the motor winding current is a q-axis component of a d/q representation of the motor winding current.

16. The apparatus of claim 15, wherein the phase detector comprising:
a demodulator to generate a q-axis response signal via demodulation of the estimated q-axis component of the d/q representation of motor winding current utilizing an excitation signal exhibiting a waveform and frequency of an excitation voltage utilized to modulate motor current-control signals; and
a low-pass filter to generate the error signal by low-pass filtering the q-axis response signal.

17. The apparatus of claim 16, comprising:
an amplifier to multiply the low-pass filtered q-axis response signal with a fixed gain value to generate the error signal.

* * * * *